United States Patent [19]
Hsieh

[11] Patent Number: 5,842,712
[45] Date of Patent: Dec. 1, 1998

[54] STRENGTHENED BICYCLE FRAME AND TUBE

[76] Inventor: Wen Cheng Hsieh, 29334 Golden Meadow Dr., Rancho Palos Verdes, Calif. 90275

[21] Appl. No.: 699,626

[22] Filed: Aug. 19, 1996

[51] Int. Cl.[6] .................................................. B62K 19/02
[52] U.S. Cl. ........................................ 280/281.1; 280/274
[58] Field of Search ................................ 280/281.1, 274, 280/282, 288.3

[56] References Cited

U.S. PATENT DOCUMENTS

| | | | |
|---|---|---|---|
| 4,293,141 | 10/1981 | Brilando | 280/281.1 |
| 5,011,172 | 4/1991 | Bellanca et al. | 280/281.1 |
| 5,221,102 | 6/1993 | Spangler | 280/281.1 |
| 5,253,890 | 10/1993 | Takamiya et al. | 280/281.1 |
| 5,478,100 | 12/1995 | McDermitt, Jr. et al. | 280/281.1 |

FOREIGN PATENT DOCUMENTS

| | | | |
|---|---|---|---|
| 0895046 | 1/1945 | France | 280/281.1 |
| 0743544 | 12/1943 | Germany | 280/281.1 |

*Primary Examiner*—Daniel G. DePumpo
*Attorney, Agent, or Firm*—Curtis L. Harrington

[57] ABSTRACT

An improved frame involves two main principles which contribute to a superior bicycle frame. The first principle involves the use of a tear drop cross sectionally shaped down tube which is oriented with the small radius side facing forward and down. This orientation of the tube, for a given size of bicycle frame yields an unexpectedly high force to failure characteristic. In the case of a forward shock as by hitting a pothole, rock, or log, the resulting frame will be much more resistant to damage. Secondly, the preferred embodiment of the frame includes three sections, including a teardrop section, a transition section in which the teardrop shape transitions to a round shape, and a length of straight tube. The transition to a round shape, with or without a length of constant circular round shape adds rigidity to the bottom of the frame to provide provide increased lateral support.

10 Claims, 3 Drawing Sheets

STRENGTHENED BICYCLE FRAME AND TUBE

FIELD OF THE INVENTION

The present invention relates to the field of an improved, bicycle frame which has improved strength and weight characteristics and particularly to a tear-drop tube which includes a first tear drop section, a second transition section for transition from tear drop to round, and a third section of constant round tubing, the improved bicycly frame providing increased resistance to bending while providing lateral support at the bottom of the down tube.

BACKGROUND OF THE INVENTION

The conventional bicycle frame includes a nearly triangular structure having three to four members. A vertical seat tube supports the seat, a horizontal tube extends forward from the seat tube and may engage a fitting in which the handle bar and front wheel fork assembly rotate to steer the bicycle. A down tube extends from the fitting to engage the bottom portion of the down tube. The resulting trapezoid shape has such a small dimension at the fitting that it works essentially a triangle. In some cases the upper end of the down tube may also be connected to the front portion of the horizontal tube.

For flat terrain or road bicycles, the stress placed on the frame is normally not a problem, the frame only need be strong enough to more than adequately support the rider. In the case of a mountain bike, the bicycle will experience its most severe forces. The front wheel will experience a more severe and widely varying force than the rear trailing wheel. The front wheel not only experiences bumps causing the front wheel to flex forward, but also running into and over objects which causes it to flex rearward.

The flexing rearward can be the most severe event since it can create the most severe magnitude stress, even though of short duration. In mountain bike use, it is not unusual for the bicycle to hit a pot hole while traveling downhill at a steep angle. Where the hole is deep enough, the stress from the bicycle and rider is impressed on the front wheel and transmitted through the front fork to the frame. Where the front of the frame begins to bend, the bicycle is ruined. Typically the frame cannot be re-bent to its original shape without weakening it. Even if repair were possible, the economics of repair are simply not viable. The frame, one of the most expensive bicycle parts must be replaced. Not only the cost of the frame must be considered but also the cost of re-mounting the front fork, rear gear assembly seat and pedal crank assembly into a new frame.

Moreover, stress applied to the front of a bike can cause the frame to bend laterally. When pressure is applied directly to a triangle-type structure, one method of yielding is to have the frame bend laterally. A standard round tube will not resist lateral bending unless it is made of unusually large diameter.

As such, the critical need for frames, and particularly for frames which will receive stressful use, such as mountain bikes, is the ability to withstand the maximum stress which a bicycle could experience. The ability to withstand that last additional measure of stress, is the ability to statistically reduce the incidence of bent or damaged frames. The result would be a bicycle which is tougher than other bicycles and which will last longer in an un-bent, usable condition.

SUMMARY OF THE INVENTION

The improved frame of the present invention involves two main principles which contribute to a superior bicycle frame. The first principle involves the use of a tear drop cross sectionally shaped down tube which is oriented with the small radius side facing forward and down. This orientation of the tube, for a given size of bicycle frame yields an unexpectedly high force to failure characteristic. In the case of a forward shock as by hitting a pothole, rock, or log, the resulting frame will be much more resistant to damage. The tear drop shaped transition tubing was tested against round tubing and it was found that an increase in failure stress is significant at 19 kilos of weight applied at 0.3 meters away from the front fork fitting. This unexpected result has shown the increased stress handling characteristics available with the use of teardrop tubing where the smaller radiused edge is facing forward and down.

Secondly, the preferred embodiment of the frame includes three sections, including a teardrop section, a transition section in which the teardrop shape transitions to a round shape, and a length of straight tube which finally makes a connection with the seat tube, usually through a pedal housing. The transition to a round shape, with or without a length of constant circular round shape adds rigidity to the bottom of the frame. The important aspect is that there is a round shape at the bottom end of the down tube as it connects to the remainder of the frame to provide provide increased lateral support. This increased lateral support not only gives an increased lateral strength during normal useage of the bicycle, as during pedaling, but also eliminates the possibility of lateral deformation to further strengthen against failure from front pressure. As will be shown, it is preferable to have a short section of round tubing, and the length of the constant round tubing provided can be varied depending upon the other dimensions of the bicycle frame.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
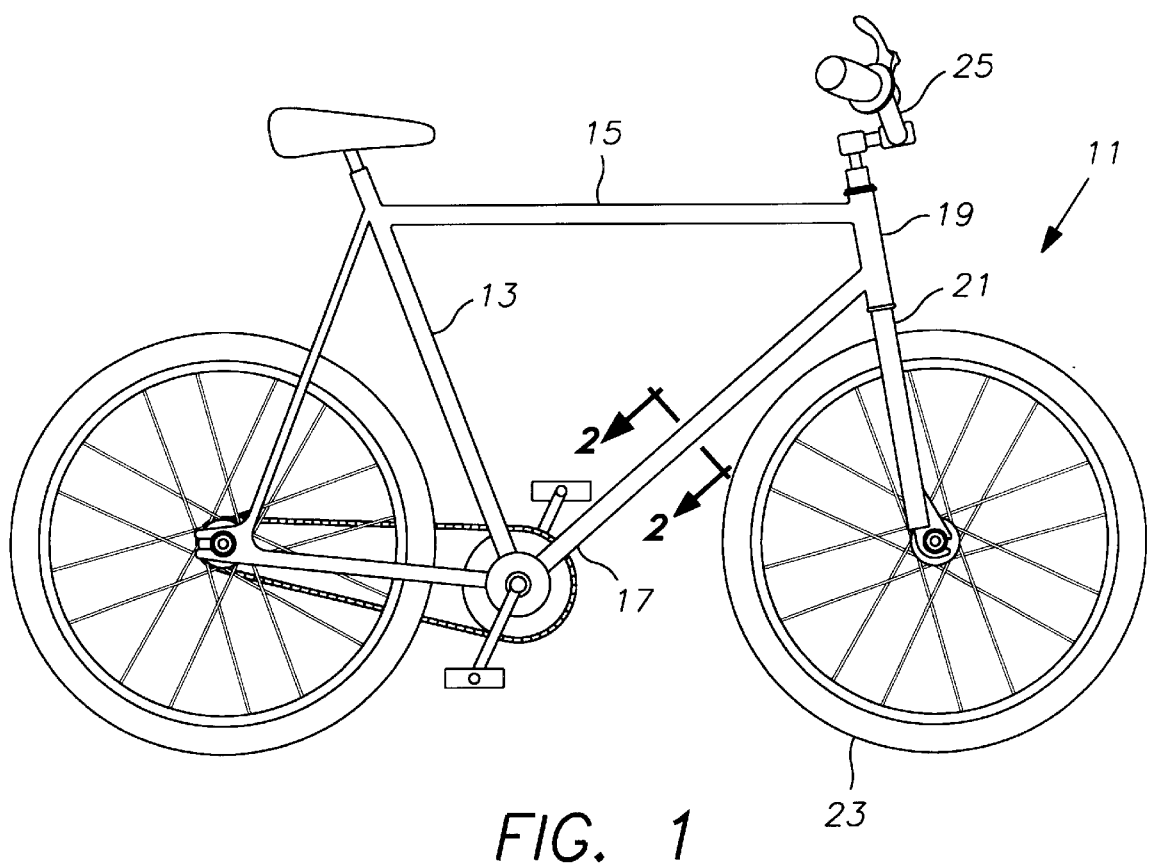
FIG. 1 is a side view of a typical mountain bicycle illustrating the orientation of the seat tube, the horizontal or top tube, and the down tube of the present invention in an enhanced strength orientation.

Referring to FIG. 1, a bicycle 11 is shown in side perspective and has a seat tube 13, a horizontal, or top tube 15 and down tube 17. The top tube 15 and upper end of the down tube 17 is joined to a front fork fitting 19. The down tube 17 is attached to the front fork fitting 19 at an angle of from about 30° to about 10° from a perpendicular connection. The front fork fitting 19 supports the front fork 21 which engages the front wheel 23. The front fork 21 has structure which extends upward and through the front fork fitting 16 and terminates at the handle bar assembly 25. Typically, the top tube 15 is completely round. The down tube 17 may be connected directly to the seat tube 13, or it can be connected through a pedal bearing housing, depending upon the construction of a given particular bicycle.

Figure 2:
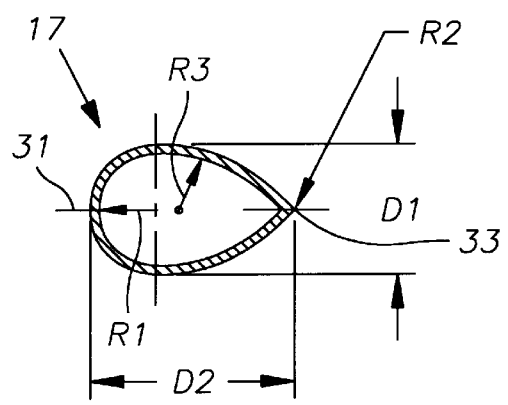
FIG. 2 is a cross sectional view of the down tube of the present invention as it is located on the bicycle of FIG. 1, with the small radius side of the down tube oriented such that it will face down and forward taken with respect to the bicycle shown in FIG. 1.

Referring to FIG. 2, view taken along line 2—2 of the down tube 17 illustrates the cross sectional profile of the down tube 17. The down tube 17 has a tear drop cross sectional shape characterized by a generally elongate, oval-like shape, but having a large radius end 31 which transitions into a relatively tight or small radius end 33.

The cross sectional shape of the down tube 17 shown in FIG. 2 is characterized by several measurements, including the minimum diameter D1 shown with width dimension lines and is in a direction perpendicular to a line bisecting the midpoints of the large and small radius ends 31 and 33, and a maximum diameter D2 which will be the distance between the mid points of the maximum and minimum radius ends 31 and 33. Further, the cross sectional shape of the down tube 17 shown in FIG. 2 can include three radii measurements. The radius of the large radius end 31, and which is labeled R1, the radius of the small radius end 33, and which is labeled R2, and the radius of a mid length location 35 which is linearly half way between the maximum and minimum radius ends 31 and 33, and which is labeled R3. The preferred ratio of the radii R2 to R1 is about 5.6.

In one preferred embodiment of the down tube 17, the small diameter is 28 millimeters, and the large diameter is 37 millimeters. The values for the radii are R1=14 millimeters, R2=2.5 millimeters and R3=30 millimeters.

In other preferred embodiments, the ratios of the magnitudes of the various quantities may be duplicated in order to give similar desired characteristics. Ratios of distances or angles may be duplicated to give advantages of scale.

Figure 3:
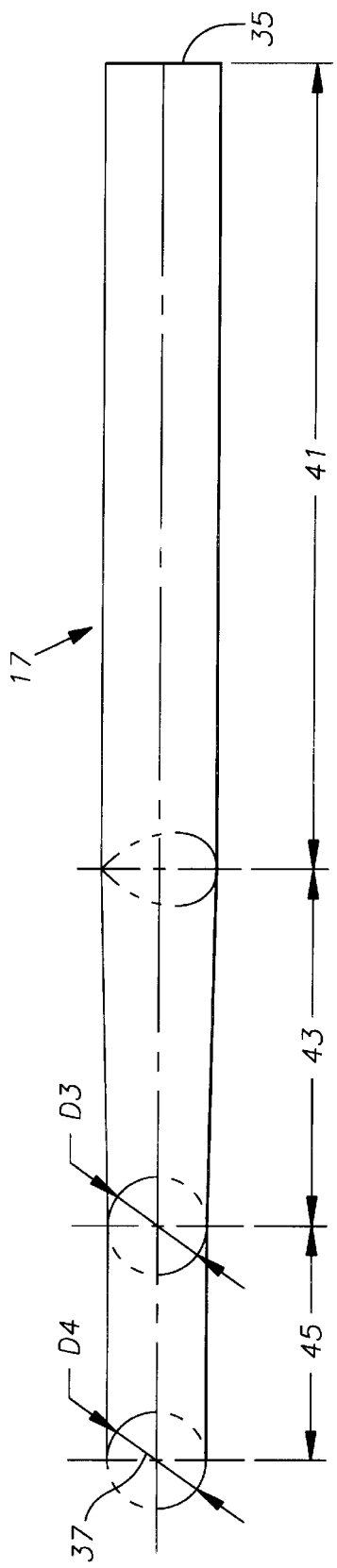
FIG. 3 is a side view of the down tube seen in FIGS. 1 and 2, and illustrating a first length of constant tear drop cross section, a second length of transition to a round cross section, and a third section of constant circular tube.

Referring to FIG. 3, a side sectional view of the down tube 17 of FIGS. 1 and 2 is illustrated. The down tube 17 has a first end 35 which will be attached to the front fork fitting 19, and a second end 37 which will attach at or near the seat tube 13. The down tube 17 is characterized as having three sections. In a first section 41 the cross sectional profile of the down tube 17 matches that shown in FIG. 2. The length of the first section 41 will depend upon the size of the frame for the bicycle 11, and cutting to determine frame size will be done in the first section 41. The first section 41 can be from about 200 to 280 millimeters. Adjacent the first section 41 is a second section 43, which forms a transition section where a first end of the second section 43 has a shape matching the cross sectional shape shown in FIG. 2, and a second end of the second section 43 is completely round. The completely round end of the second section is of a diameter which is used to characterize the down tube as a whole. In a preferred embodiment, the length of the section 43 is about 120 millimeters, and the circular diameter of the second end, D3 is about 31.8 millimeters.

A third section 45 lies adjacent the second section 43 and is preferably tubular and completely circular in cross section, and provides lateral stability. Both the first end and the second end of the third section 45 has a diameter of 31.8 millimeters. The third section may preferably terminate in an angular cut to facilitate connection to a bearing structure or other shape. In a preferred embodiment, the length of the third section 45 is about 60 millimeters. It is understood that the preferred embodiment is of a single size, and that other preferred embodiments will have differing dimensions, but which loosely similar proportions as described for the preferred embodiment described above. Also the ratio of the second section to the third section may be between about 3 to 1 to about 1 to 1. The first section 41 may have a length of between about 180 to about 280 millimeters, again depending upon the size of the bicycle 11 frame 51 being constructed.

In a second preferred embodiment of the down tube 17, the small diameter D1 is about 28 millimeters while the large diameter D2 is about 41 millimeters. The values for the radii of the cross section of the down tube 17 are R1=14 millimeters, R2=2.5 millimeters and R3=50 millimeters. The circular diameter of the second end of the second section 43, D3, is about 34.9 millimeters, while the other dimensions of the down tube 17 remain identical to the first above mentioned preferred embodiment. The preferred diameter ratios D2 to D2 have been found to be from about 1.46 to about 1.32.

Figure 4:
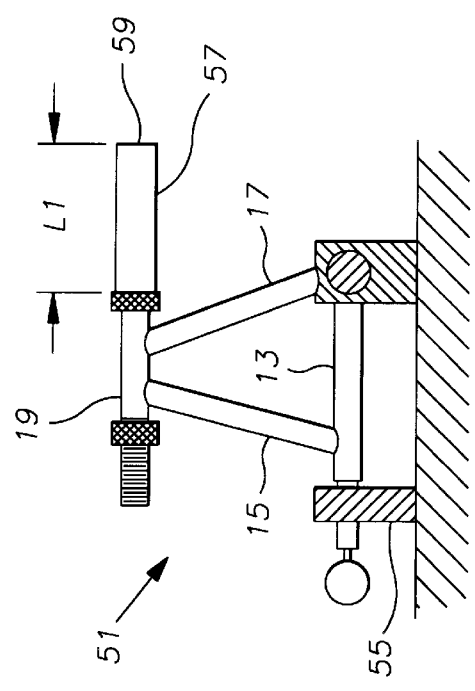
FIG. 4 is a schematic drawing of a test stand for testing a bicycle frame in which stress is applied a distance away from the front fork fitting and which was used to show the unexpected results of the present invention.

Referring to FIG. 4, a test stand is illustrated in which the unexpected result of the present invention was proven. A bicycle frame 51 has been isolated, and includes the top tube 15, seat tube 13, down tube 17, and the front fork fitting 19. The frame 51 is supported by a first support block 53 and a second support block 55. A load bearing extension member 57 is inserted into and locked with respect to the front fork fitting 19. A far end 59 of the load bearing extension member 57 extends a length L1 of about 300 millimeters from the front fork fitting 19. This is about the same distance in which the axle of a front wheel 23 would extend at the end of a front fork 21 on the bicycle 11. With this test stand configuration, a direct stress force may be applied against the front fork fitting 19 which will be the same force which the front fork fitting 19 will experience from the wheel 23. the frame 51 can be tested to see how it reacts to stress. Typically a force will be applied to the far end 59 by the application of different weights. The vertical deflection of the far end 59 in response to the masses applied is the strain measured in millimeters of deflection, for each magnitude of mass suspended from the far end 59. This is continued until the frame 51 fails.

Figure 5:
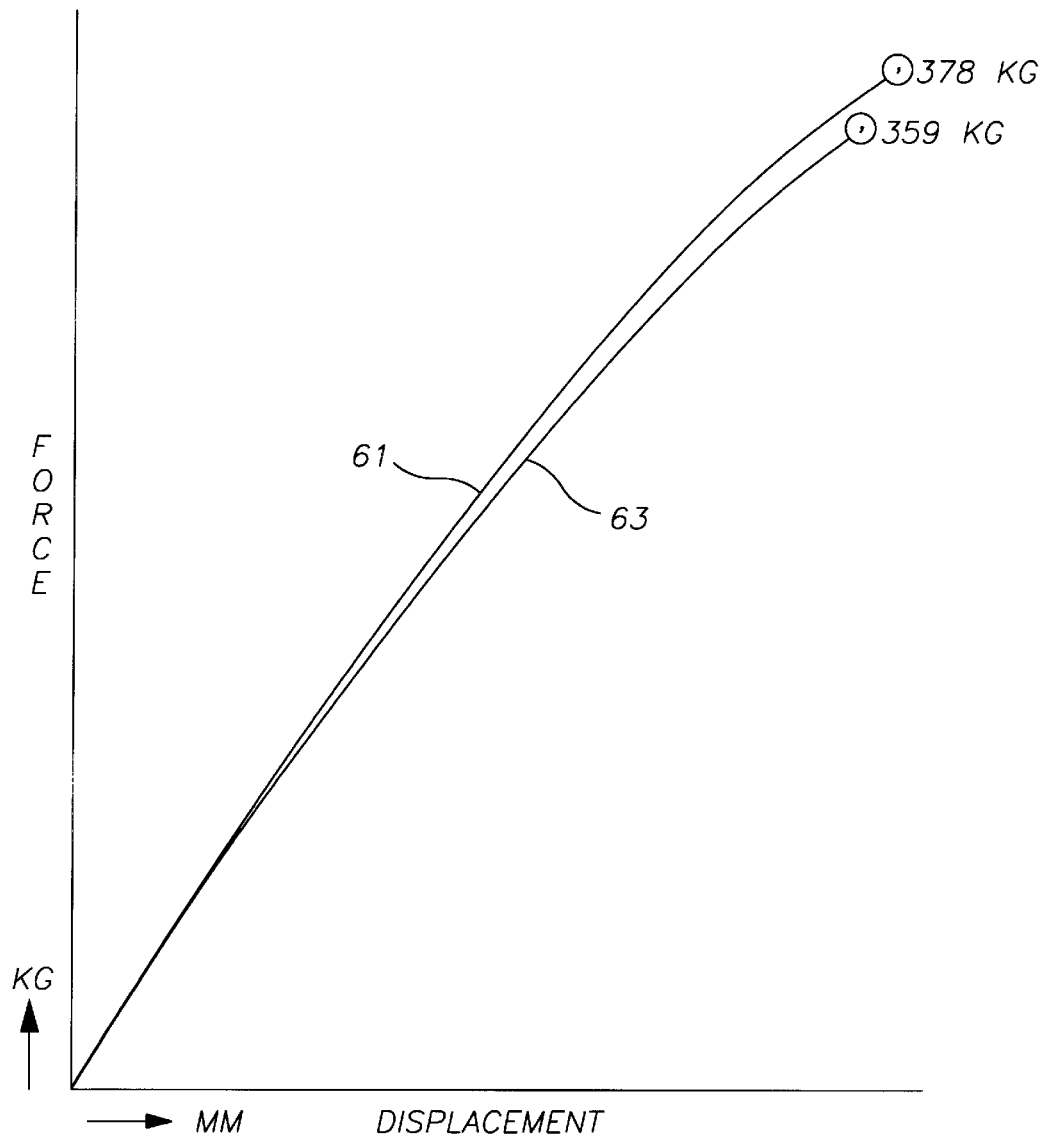
FIG. 5 is a graph illustrating the stress-strain characteristic of the tear drop tube of the present invention as it is stressed to failure and compared with conventional round tube.

Referring to FIG. 5, the stress-strain characteristic of a test setup utilizing the frame 51 is shown. The frame 51 utilizes the down tube 17 described in the one preferred embodiment having a small diameter D1 of 28 millimeters, large diameter D2 is 37 millimeters, and radius value of R1=14 millimeters, R2=2.5 millimeters and R3=30 millimeters. The top tube 15 is a round tube having a diameter of 28.6 millimeters.

In FIG. 5, a function 61 represents the stress-strain characteristic for the frame 51 having both the down tube 17 and top tube 15 just described. The function 61 shows that as the load bearing extension member 57 is loaded with increasing amounts of mass, there is vertical displacement of the end 59 of the load bearing extension member 57 which continues until the frame 51 fails. Failure of the frame 51 occurs at the end of the function 61 as shown by a circular data point, and failure occurs at a force produced by a 378 KG load.

Adjacent and to the right of the function 61 is a function 63 which was obtained by using a frame 51 having standard round tube fittings. The frame 51 without the tear drop down tube of the present invention had the same top tube 15 diameter of 28.6 millimeters and a completely round down tube having a diameter of 31.8 millimeters, in place of the down tube 17 of the present invention.

The function 63 shows that as the load bearing extension member 57 is loaded with increasing amounts of mass failure occurs at the end of the function 63 as shown by a circular data point, and failure occurs at a force produced by a 359 KG load. Comparison of the function 63 with the function 61 shows that with the down tube of the present invention, an additional force can be withstood equal to the force of an additional 19 kilograms.

This difference is significant since it will allow much greater force to be experienced by the frame 51 without a failure. In the case of shock-type forces which are of momentary duration, the performance of the frame 51 incorporating the down tube 17 of the present invention will perform proportionately better than the percentage differences of a static load test produces.

The frame 51 employing the down tube 17 enables a stronger frame for a given size of frame 51 components. Thus, for the same durability, the frame of the present invention permits smaller tubular members, and in particular the down tube 17.

While the present invention has been described in terms of a tube addition to a bicycle frame in a particular orientation, one skilled in the art will realize that the techniques of the resulting structure of the present invention can be applied to many such structures and appliances. The present invention may be applied in any situation where increase strength is sought.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A bicycle frame comprising:
   a seat tube having a first end and a second end;
   a top tube having a first end and a second end, said first end of said top tube attached to said seat tube nearer said first end of said seat tube than said second end of said seat tube;
   a front fork fitting having a first end and a second end, the second end of said top tube connected to said front fork fitting nearer said first end of said front fork fitting than said second end of said front fork fitting;
   a down tube having a first end and a second end and having at least two sections including a first section having a first end and a second end in common w with said second end of said down tube, said first section having a portion of its length having a tear drop cross sectional profile having a small radius side and a large radius side, and a second section having a first end in common with said first end of said down tube and a second end connected to said first end of said first section and having a transitional profile including a gradual transition from said teardrop cross section at said second end of said second section and transitioning to a round cross section at said first end of said second section, said first end of said down tube connected to said seat tube nearer said second end of said seat tube than said first end of said seat tube, said second end of said down tube connected to said front fork fitting nearer said second end of said front fork fitting than said first end of said front fork fitting, said down tube oriented such that said small radius side of said first section is disposed away from said bicycle frame.

2. The bicycle frame of claim 1 wherein the connection between said down tube and said front fork fitting is about 20°.

3. The bicycle frame of claim 1 wherein said down tube has a minimum diameter D1 and a maximum diameter D2 and where the ratio D2/D1 of the diameters is from about 1.46 to about 1.32.

4. The bicycle frame of claim 3 wherein said down tube has a small diameter D1 of about 28 millimeters and a large diameter D2 of about 37 millimeters.

5. The bicycle frame of claim 3 wherein said down tube has a small diameter D1 of about 28 millimeters and a large diameter D2 of about 41 millimeters.

6. The bicycle frame of claim 1 wherein the small radius side of said down tube has a an radius R1 and wherein the large radius side of said down tube has a radius R2 and where the ratio R2/R1 of the radii is about 5.6.

7. The bicycle frame of claim 6 wherein said small radius side of said down tube has a an radius R1 of about 2.5 millimeters and wherein said large radius side of said down tube has a radius R2 of about 14.0 millimeters.

8. A bicycle frame comprising:
   a seat tube having a first end and a second end;
   a top tube having a first end and a second end, said first end of said top tube attached to said seat tube nearer said first end of said seat tube than said second end of said seat tube;
   a front fork fitting having a first end and a second end, the second end of said top tube connected to said front fork fitting nearer said first end of said front fork fitting than said second end of said front fork fitting;
   a down tube having a first end and a second end and having at least three sections including a first section having a first end and a second end in common with said second end of said down tube, and having a tear drop cross sectional profile having a small radius side and a large radius side,
   a second section having a first end and a second end connected to said first end of said first section and having a transitional profile including a gradual transition from said teardrop cross section at said second end of said second section and transitioning to a round cross section at said first end of said second section
   a third section having a first end in common with said first end of said down tube and a second end connected to said first end of said second section and having a constant circular cross sectional radius, said first end of said down tube connected to said seat tube nearer said second end of said seat tube than said first end of said seat tube, said second end of said down tube connected to said front fork fitting nearer said second end of said front fork fitting than said first end of said front fork fitting, said down tube oriented such that said small radius side of said first section is disposed away from said bicycle frame.

9. The bicycle frame of claim 8 wherein the ratio of the length of said first section to said second section is between about 2⅓ to 1 about 1 to 1.

10. The bicycle frame of claim 8 wherein the ratio of the length of said second section to said third section is between about 3 to 1, to about 1 to 1.

* * * * *